United States Patent

Pedersen

[11] Patent Number: 5,918,678
[45] Date of Patent: Jul. 6, 1999

[54] HORSESHOE

[75] Inventor: Lone Pedersen, Båstad, Sweden

[73] Assignee: AB Halmstads Gummifabrik, Sweden

[21] Appl. No.: 08/535,081

[22] PCT Filed: Mar. 7, 1994

[86] PCT No.: PCT/SE94/00193

§ 371 Date: Jan. 22, 1996

§ 102(e) Date: Jan. 22, 1996

[87] PCT Pub. No.: WO94/22296

PCT Pub. Date: Oct. 13, 1994

[30] Foreign Application Priority Data

Apr. 5, 1993 [SE] Sweden .................................. 9301121

[51] Int. Cl.$^6$ .................................................. A01L 1/04
[52] U.S. Cl. ................................................. 168/4; 168/23
[58] Field of Search ..................... 168/4, 13, 23

[56] References Cited

U.S. PATENT DOCUMENTS 2,085,347  6/1937  Wachter ..................... 168/13
5,137,092  8/1992  Tuunanen ................. 168/DIG. 1 X

FOREIGN PATENT DOCUMENTS

30924/30    8/1931   Australia .
735121     11/1932   France ......................... 168/4
39 28 341 A1  2/1991   Germany .
400992     11/1933   United Kingdom ............ 168/13

Primary Examiner—Robert P. Swiatek
Attorney, Agent, or Firm—Rader, Fishman, Grauer & McGarry

[57] ABSTRACT

A horseshoe includes a core of metal which is surrounded by a plastic or rubber material. The horseshoe is provided with a number of apertures (10) which are intended for nails and which taper upwardly from the underside (4) of the horseshoe. In order to facilitate the correct alignment of the nails when these are driven into a horseshoe of relatively great vertical thickness, the center points of the largest and smallest sections of the aperture (10) are offset in a horizontal plane relative to one another in a direction towards or away from a central region (3) of the horseshoe. This offset may vary in both size and direction from one aperture to the next within the same horseshoe.

17 Claims, 2 Drawing Sheets

HORSESHOE

TECHNICAL FIELD

The present invention relates to a horseshoe of the type which has a core of metal and, at least on the underside, a coating of plastic, rubber or rubber-like material, the horseshoe being provided with a number of apertures intended for nails, the apertures having lower portions which, from the underside of the horseshoe, taper upwardly,

BACKGROUND ART

Horseshoes of the type intimated by way of introduction are known in both the above-mentioned composite design and in the form of conventional all-metal designs.

When a horse is shod with shoes of this type, the nails are driven in from the underside of the shoe and up through the hoof, the aim in this instance being that the nail will emerge at a reasonable height above the upperside of the shoe.

In such cases when the horseshoe is of greater height (or thickness) than conventionally, that region within which the nail can be guided in an inward-outward direction when it is driven home is restricted because of the height of the aperture in the horseshoe. As a result, in high—or thick horseshoes, it is difficult to guide the nail in exactly the correct intended direction.

PROBLEM STRUCTURE

The present invention has for its object to realise a horseshoe of the type mentioned by way of introduction, the horseshoe being designed in such a manner that it considerably facilitates the application of the nails. The present invention further has for its object to realise a horseshoe which displays greater height or thickness than conventional shoes and which, this notwithstanding, presents no problems in respect of alignment and application of the nails. The present invention further has for its object to realise a horseshoe which simple and economical in manufacture and which, in purely general terms, is easy to use.

SOLUTION

The objects forming the basis of the present invention are attained if the horseshoe intimated by way of introduction is characterized in that the centrepoints of the largest and smallest sections of the apertures are offset in the horizontal plane in relation to one another in a direction away from or towards the central region of the horseshoe.

As a result of these characterizing features, a horseshoe will be realised in which the nails employed can be given the correct alignment on being driven home.

According to a first embodiment of the present invention, it further also suitably applies that the centrepoint in the lower section is offset inwardly towards the centre of the horseshoe.

According to another embodiment of the present invention, it also suitably applies that the centrepoint in the lower section is offset outwardly from the centre of the horseshoe.

As a result of these characterizing features, the possibility is afforded of adapting the alignment and direction of the nails both in respect of the placing of the aperture in the horseshoe in an inward/outward direction towards and away from the centre of the horseshoe, respectively, and in respect or the appearance of the hoof of the animal, as well as personal preferences.

Further advantages will be attained according to the present invention if the horseshoe according to the invention is also given one or more of the characterizing features as set forth in the appended Claims.

BRIEF DESCRIPTION OF THE ACCOMPANYING DRAWING

The present invention will now be described in greater detail hereinbelow, with particular reference to the accompanying Drawing, in which.

DESCRIPTION OF EMBODIMENTS

Figure 1:
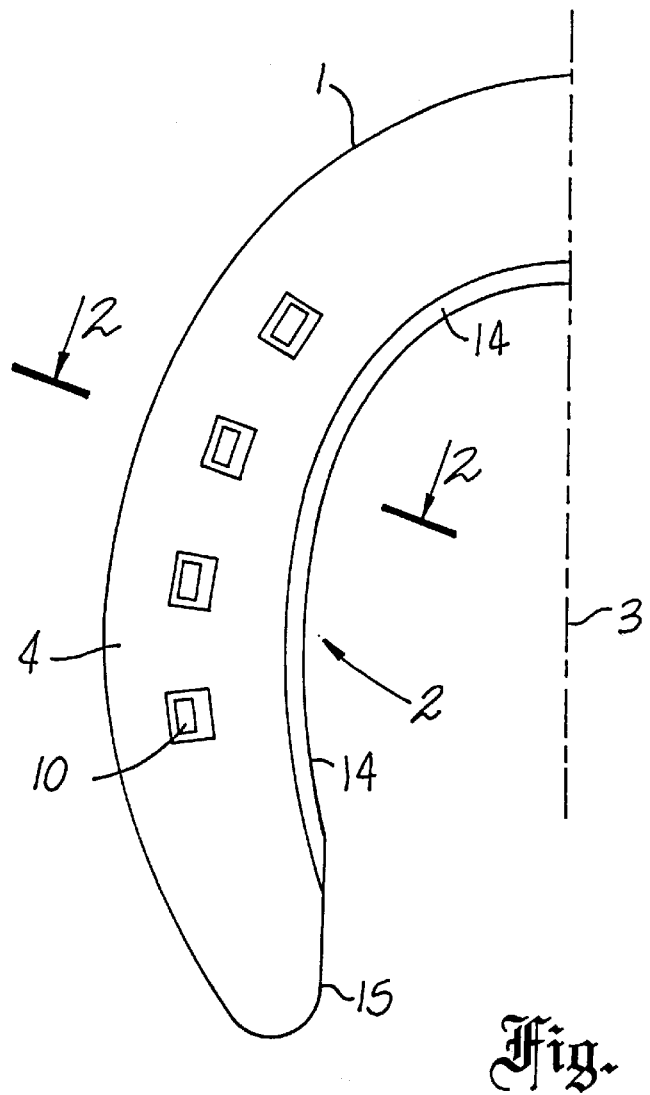
FIG. 1 shows from beneath approximately half of a horseshoe according to the present invention.

FIG. 1 shows from beneath a horseshoe of the type to which the present invention relates. It will be apparent from the Figure that the horseshoe has an arched outer side 1 with a defining surface which is substantially at right angles to a substrate on which the horseshoe rests. Further, the horseshoe has an inside 2 which faces towards the centre or central region 3 of the horseshoe. The detailed design of the inside of the horseshoe will be described in greater detail below. Finally, FIG. 1 shows the underside 4 or wear surface of the horseshoe.

Figure 2:
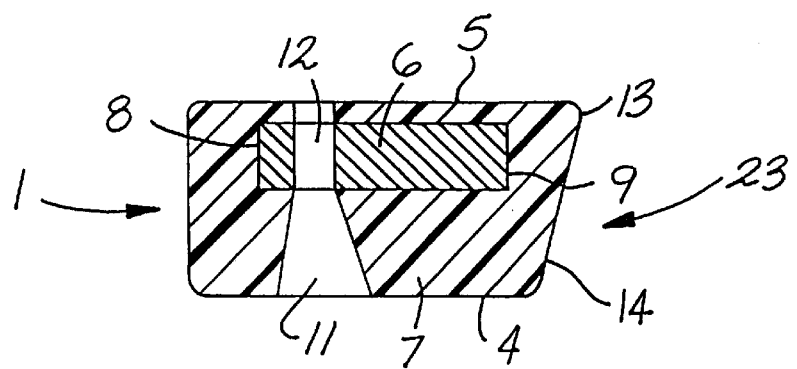
FIG. 2 is a section taken along the section line A—A in FIG. 1.

FIG. 2 shows a schematic cross section through the horseshoe according to FIG. 1, it being apparent from this Figure that the underside 4 is parallel with the upper side 5 of the horseshoe and that these are substantially planar. It will further be apparent from this Figure that the horseshoe has a core 6 which is produced of metal and which, in the illustrated embodiment, is wholly enclosed by a plastic material, a rubber material or a rubber-like material 7.

The distance between the upper side of the metal core 6 and the upper side 5 of the horseshoe is relatively slight and may lie in the order of magnitude of between a half and 2 millimeters, preferably about 1 millimeter. The part of the horseshoe located on the underside of the metal core 6 is of considerably greater thickness, viz. at least the same thickness as the thickness of the metal core, but preferably of somewhat larger thickness. Thus, the part of the rubber material located on the underside of the metal core may have a thickness which amounts to between 1 and 1½ times the thickness of the metal core. In one concrete example, the part of the shoe located above the metal core 6 may be of a thickness of 1 mm, the metal core 6 may be of a thickness of 5 mm and the part located beneath the metal core may be of a thickness of approx. 8 mm. Consequently, the total height, or thickness, of the horseshoe is greater than is the case conventionally in horseshoes which are all-metal.

The extent of the metal core is such that it substantially extends throughout the whole of the horseshoe and has defining edges 8 and 9 which are largely parallel with the outer side 1 of the horseshoe and its inner side 2.

The above-outlined dimensions or proportions of the horseshoe entail that the relationship between the height or thickness of the horseshoe and its width in the region of the apertures 10 which are employed for fixing the horseshoe in place may lie in the order of magnitude of between 0.35 and 0.65, preferably approx. 0.5.

FIG. 1 shows a horseshoe with four apertures 10 for accommodating nails, but both more and fewer such apertures may of course be used. The apertures 10 extend through the horseshoe from its underside to the upper side 5. The apertures 10 have a lower portion 11 which flares in a downward direction and which is substantially in the form of a quadrilateral pyramid. The apertures 10 are further provided with an upper portion 12 of substantially constant and approximately rectangular cross section. Suitably, the transitional region between the upper and lower portions 12 and 11, respectively is approximately flush with the underside of the metal core 6.

On the Drawing Figures, the positions of the apertures 10 have been shown as located approximately centrally in or slightly outside the centre of the horseshoe seen in a direction in towards or out from its central region 3. Depending slightly on the placing of the apertures 10 in this direction, there may be a need to be able to drive in a nail employed for fixing the horseshoe in place more or less obliquely so that the nail emerges at the desired distance from the underside of the hoof.

FIG. 2 shows that the upper portion 12 of the apertures has a longitudinal axis which makes substantially a right angle with the mutually substantially parallel upper and lower sides of the metal core 6 and with the upper side 5 and underside 4 of the horseshoe proper.

The lower portion 11 of the aperture may be asymmetric and is designed such that its largest cross sectional area is offset in a horizontal direction either inwards towards the central region 3 of the horseshoe, or outwards therefrom in relation to the smallest cross section in the aperture 10. For one or a few of the apertures 10 in a horseshoe, the largest cross sectional area may possibly also lie straight beneath the smallest, so that the aperture is symmetric and will have a longitudinal axis which is at right angles to the underside 4 of the horseshoe.

The reason for the generally preferred asymmetric design of the apertures 10 is that, because of the considerable height or thickness of the horseshoe. It is either impossible or at least very difficult, with conventionally designed apertures 10, to drive in a nail obliquely outwards or obliquely inwards in relation to a line at right angles to the underside of the horseshoe.

The asymmetry in the apertures 10 may, in a first embodiment, be such that the largest cross section is offset in an inward direction towards the centre of the horseshoe or its central region. In a second embodiment, the largest cross section may be offset in the opposite direction, i.e. outwards from the central region. In a third embodiment, the offset of the largest cross section may vary from aperture to aperture in the horseshoe so that the permitted region of inclination for the nail may vary from one aperture to the next.

It was mentioned above that the lower portion 11 of the aperture 10 approximately has the form of a truncated pyramid which may be oblique or asymmetric. The relationship between the height of that part of the aperture 10 which is of substantially constant cross section and the height of the truncated pyramid portion suitably lies in the range of between 0.30 and 0.55, but is preferably approx. 0.43. This design of the aperture 10 also entails that the nail, when this is driven home, will abut against the lower hole edges in the metal core 6.

In order to increase the range of that angle within which the nail can be driven home obliquely in relation to the underside of the horseshoe, it may also be possible to make an upper portion of the aperture 10 (not specifically marked on the Drawing) conically flaring in an upward direction, so that the aperture will thereby be largely of hourglass shape, seen in vertical cross section.

The inner side 2 of the horseshoe has an upper wail portion 13 which is approximately at right angles to the upper side of the horseshoe, and a lower wall portion 14 which slopes downwardly out from the centre of the horseshoe or its central region 3. That space which the inner side 2 of the horseshoe defines will therefore be tapering in an upward direction along the major portion of the inner defining surface 2 of the horseshoe. Hereby, the advantage will be afforded that the horseshoe will be self-cleaning so that earth, snow or other foreign matter will show a considerably reduced tendency to adhere or accumulate.

This self-cleaning function is also reinforced by the fact that the plastic, rubber or rubber-like material 7 in the horseshoe will, when the horseshoe is in use, be deformed and compressed in the vertical direction at the same time as moving in the horizontal direction. This implies that at least the greater part of the obliquely bevelled lower portion 14 of the inner side 2 of the horseshoe will move in a horizontal direction inwards towards the centre 3 of the horseshoe and will recuperate outwards therefrom when the loading on the horseshoe ceases. These lateral movements in the material naturally also entail that the risk that foreign matter fasten interiorly in the horseshoe or in the hoof of the animal is reduced.

The bevelled portion 14 of the inner side 2 of the horseshoe extends along the greater portion of the inner side 2, at least along the front area thereof and the front areas of the side portions thereof. As shown in FIG. 1, the unbevelled portion 13 of the inner side 2 may possibly vertically cover almost the entire horseshoe along the rearmost portions 15 of the inner side 2.

In FIG. 2, the bevelled portion 14 of the inner side 2 is shown with an approximately rectilinear generatrix, but the generatrix may, of course, also be curved.

Figure 3:
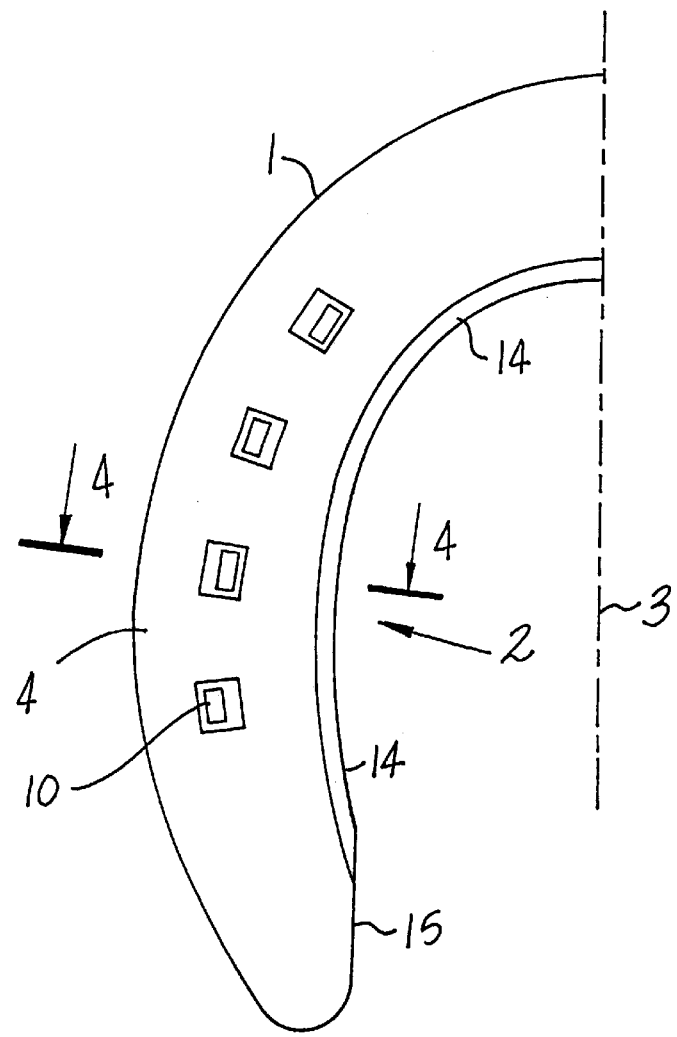
FIG. 3 shows from beneath approximately half of a second embodiment of a horseshoe according to the present invention.
Figure 4:
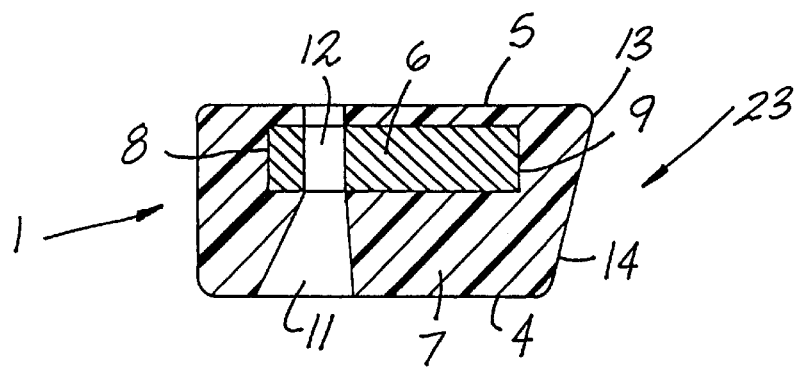
FIG. 4 is a section taken along the section line B—B in FIG. 3.

FIGS. 3 and 4 show another embodiment of a horseshoe according to the invention, similar in # configuration to the horseshoe illustrated in FIGS. 1 and 2. In this embodiment, it will be apparent that like numerals refer to like components. The configuration illustrated in FIG. 3 shows adjacent apertures with different offsets. Thus, for example, FIG. 4 shows a schematic cross-section through the horseshoe according to FIG. 3 wherein the offset is in an opposite direction from the offset illustrated in FIG. 2, i.e., outwardly of the central region. As can be seen in FIG. 3, the offset of the largest cross-section varies from aperture to aperture. This variance may be in adjacent apertures as illustrated in FIG. 3, or in any order among the apertures.

The present invention may be modified without departing from the spirit and scope of the appended Claims.

I claim:

1. A horseshoe of the type which has a core of metal and, at least on the underside of the metal core, a coating of plastic, rubber or rubber-like material so that the shoe is thicker than a conventional metal shoe, the horseshoe being provided with a number of apertures intended for nails, each aperture having an upper portion extending through the metal core, a lower portion which, from the underside of the horseshoe, tapers upwardly, and a transition region where the upper and lower portions meet, the centerpoints of the largest and smallest sections of each aperture being offset in horizontal planes in relation to one another in a direction away from or towards a central region of the horseshoe, at least two apertures having different offsets, each upper portion having a substantially constant cross section, and the transition region between the upper portion and the lower portion of each aperture being located approximately at the level of the underside of the metal core.

2. The horseshoe as claimed in claim 1 characterized in that a portion of the aperture which is located on the underside of the metal core flares downwards from the metal core in the form of a broadening pyramid.

3. The horseshoe as claimed in claim 2 characterized in that in the region of the aperture, the ratio between the height and width is between 0.35 and 0.65.

4. The horseshoe as claimed in claim 3 characterized in that the ratio between the height of the upper portion of substantially constant cross section and the portion which flares downwardly is between 0.30 and 0.5.

5. The horseshoe as claimed in claim 4, characterized in that on its inner side the horseshoe has a wall portion which, in a downward direction, slopes outward from the central region of the horseshoe.

6. A horseshoe comprising:

an elastomeric member;

a one piece metal core having substantially planar upper and lower surfaces and circumferentially extending outer and inner surfaces, at least the outer, inner, and lower of the metal core being embedded in the elastomeric member;

apertures intended for nails, each aperture having a lower portion which, from the underside of the horseshoe, tapers upwardly, an upper portion with a substantially constant cross section, and a transition region between the upper and lower portions located approximately at the level of the lower surface of the metal core, the centerpoints of the largest and smallest sections of each aperture being offset in horizontal planes in relation to one another in a direction away from or towards a central region of the horseshoe, the offset centerpoint of the largest section being different for at least two apertures.

7. A horseshoe as claimed in claim 6 wherein the portion of the aperture having a substantially constant cross section is located in the metal core.

8. The horseshoe as claimed in claim 6 characterized in that the centerpoint in the lower portion is offset inwards towards the center of the horseshoe.

9. The horseshoe as claimed in claim 6 characterized in that the centerpoint in the lower portion is offset outwards from the center of the horseshoe.

10. The horseshoe as claimed in claim 6 characterized in that the lower portion of the aperture which is located on the underside of the metal core flares downwards from the metal core in the form of a broadening pyramid.

11. The horseshoe as claimed in claim 10 characterized in that the ratio between the height of that portion of the aperture which is of substantially constant cross section and that portion which flares downwardly is of the order of magnitude of between 0.30 and 0.55, preferably approximately 0.43.

12. The horseshoe as claimed in claim 6 characterized in that, in the region of the apertures, its ratio between height and width is of the order of magnitude of between 0.35 and 0.65, preferably approximately 0.5.

13. The horseshoe as claimed in claim 6 characterized in that on its inner side the horseshoe has a wall portion which, in a downward direction, slopes outwards from the center of the horseshoe.

14. The horseshoe as claimed in claim 13 characterized in that the sloping wall portion consists in its entirety of rubber or rubber-like material.

15. The horseshoe as claimed in claim 13 characterized in that the sloping wall portion extends along a front portion of the inner circumferential surface of the horseshoe.

16. The horseshoe as claimed in claim 13 characterized in that the sloping wall portion extends from the lower side of the horseshoe and upwards at least to half of the height of the horseshoe.

17. The horseshoe as claimed in claim 6 characterized in that the metal core is completely embedded in the elastomeric member.

* * * * *

UNITED STATES PATENT AND TRADEMARK OFFICE
CERTIFICATE OF CORRECTION

PATENT NO.: 5,918,678

DATED: July 6, 1999

INVENTOR(S): LONE PEDERSEN

It is certified that error appears in the above-identified patent and that said Letters Patent is hereby corrected as shown below:

Col. 5, paragraph 4, line 15, "0.5" should be --0.55--.
Col. 5, paragraph 5, line 16, there should be no comma after "claim 4".

Signed and Sealed this

Sixteenth Day of November, 1999

Attest:

Q. TODD DICKINSON

*Attesting Officer*  *Acting Commissioner of Patents and Trademarks*